United States Patent [19]

Kieke et al.

[11] Patent Number: 5,035,288

[45] Date of Patent: Jul. 30, 1991

[54] LIGNIN PHENOL/LIGNIN/AMINE SURFACTANT SYSTEM

[75] Inventors: Dan E. Kieke; Douglas G. Naae, both of Houston, Tex.

[73] Assignee: Texaco Inc., White Plains, N.Y.

[21] Appl. No.: 539,506

[22] Filed: Jun. 18, 1990

[51] Int. Cl.$^5$ ............................................... E21B 43/22
[52] U.S. Cl. .................................... 166/274; 166/275; 252/8.554
[58] Field of Search ...................... 166/273, 274, 275; 252/8.554

[56] References Cited

U.S. PATENT DOCUMENTS

| | | | |
|---|---|---|---|
| 4,548,721 | 10/1985 | DeBons et al. | 166/275 X |
| 4,611,659 | 9/1986 | DeBons et al. | 166/274 |
| 4,756,370 | 7/1988 | DeBons | 166/273 |
| 4,781,251 | 11/1988 | Naae et al. | 166/274 |
| 4,787,454 | 11/1988 | Naae et al. | 166/275 X |
| 4,790,382 | 12/1988 | Morrow et al. | 166/274 |
| 4,821,803 | 4/1989 | DeBons | 252/8.554 X |
| 4,822,501 | 4/1989 | DeBons et al. | 166/275 X |

*Primary Examiner*—George A. Suchfield
*Attorney, Agent, or Firm*—Jack H. Park; Kenneth R. Priem; Harold J. Delhommer

[57] ABSTRACT

The invention is a method of recovering hydrocarbons from an underground hydrocarbon formation penetrated by at least one injection well and at least one production well, which comprises injecting into an underground formation through an injection well about 0.05 to about 1.0 pore volumes of an aqueous surfactant slug comprising about 0.1% to about 10% by weight of a surfactant system, injecting a drive fluid into the formation through the injection well to push the surfactant slug towards the production well, and recovering hydrocarbons at the production well, said surfactant system comprised of a lignin phenol surfactant, a lignin, a primary amine having about 8 to about 20 carbon atoms, and a solubilizer.

16 Claims, No Drawings

LIGNIN PHENOL/LIGNIN/AMINE SURFACTANT SYSTEM

BACKGROUND OF THE INVENTION

This invention relates to a method of recovering hydrocarbons involving a surfactant system derived from lignin products. More particularly, the surfactant system comprises four components: a lignin phenol surfactant, lignin, an amine, and a solubilizer.

Investigations of ways to increase oil recovery by improving the displacement ability of floods have produced useful surfactants which reduce the interfacial tension between the oil and water in the reservoir. With lower interfacial tension, oil that is trapped in the pore structure can disperse into the water as smaller and more easily deformable droplets. Many types of surfactants have been investigated and the choice of which surfactant to employ in a flood operation is dependent upon the conditions in the reservoir, as well as the cost and availability of the surfactants.

Most surfactant floods have employed a petroleum sulfonate as a sole surfactant, or at least a major component of a mixture of surfactants. Synthetic alkylaryl sulfonates and alkyl sulfonates and sulfates have been proposed as oil recovery surfactants. Sulfonates are preferred because they have a better high temperature stability than the sulfates. These surfactants are all classified as organic sulfonates and are usually metal salts of alkylbenzene sulfonate containing 12 to 30 carbon atoms, but may also be aliphatic sulfonates or alkylated naphthalene sulfonates. These surfactants have an equivalent weight that ranges from 320 to 700 g/equivalent.

To combat layering and precipitation problems in high salinity applications, a material with both water-soluble and oil soluble characteristics is usually added to organic sulfonate surfactant mixtures. When used in surfactant flooding, these materials are generally referred to as "solubilizers" or "cosurfactants" and often constitute the most expensive component in a surfactant mixture. Conventional solubilizers are sulfate or sulfonate salts of polyethoxylated alcohols or alkyl phenols. The amount of solubilizer required depends on the amount of and types of organic sulfonate surfactants employed in a surfactant flood operation. A minimum amount of solubilizer is required to prevent the surfactants from precipitating from the flood water. The choice of the solubilizer employed is dependent on the choice of surfactants to be used and the salinity of the flood water. Surfactant quantity is a function of the reservoir's size and other characteristics. The concentration of surfactant components in the system is usually 1% to 6% expressed on an active surfactant basis. The surfactant slug is usually made up in high salinity brine and the customary polymer slug in fresh water.

One problem with many surfactants is their high cost of manufacture. Surfactants which are relatively cheap have an inherent advantage in the market place, especially if the surfactants are to be used in a high volume, enhanced oil recovery application.

One approach taken has been to substitute lignin phenol surfactants for water soluble, petroleum sulfonate surfactants in surfactant flooding systems. This replaces some of the relatively expensive petroleum sulfonates with surfactants prepared from lignin, a low cost material. In U.S. Pat. Nos. 4,739,040 and 4,787,454, the preparation of surfactants from lignin and their use in surfactant flooding systems is discussed. These patents disclose reducing lignin in the presence of a carbon monoxide or hydrogen reducing agent at high temperature and pressure to produce low molecular weight lignin phenols, and transforming the lignin phenols to surfactants by one or a combination of several reactions such as alkoxylation, alkylation, sulfonation, sulfation, alkoxysulfation, and sulfomethylation.

Another approach has been to develop a lignin amine surfactant system wherein high equivalent weight, oil soluble, petroleum sulfonate surfactants are replaced with lignosulfonate and an amine. U.S. Pat. Nos. 4,756,370 and 4,821,803 discuss such lignin amine surfactant systems which contain less of the more expensive petroleum sulfonates and more lignin products.

A third approach of substituting lignin products for expensive petroleum sulfonate surfactants is disclosed in U.S. Pat. No. 4,548,721. This reference discloses the use of the reaction product of a lignin and an amine at elevated temperatures as an enhanced oil recovery surfactant.

SUMMARY OF THE INVENTION

The invention is a method of recovering hydrocarbons from an underground hydrocarbon formation penetrated by at least one injection well and at least one production well. The method comprises injecting into an underground formation through an injection well about 0.05 to about 1.0 pore volumes of an aqueous surfactant slug comprising about 0.1% to about 10% by weight of a surfactant system, injecting a drive fluid into the formation through the injection well to push the surfactant slug towards the production well, and recovering hydrocarbons at the production well.

The surfactant system is comprised of a lignin phenol surfactant, a lignin, a primary amine having about 8 to about 20 carbon atoms, and a solubilizer. The lignin phenol surfactant is produced by placing lignin in contact with water, converting the lignin into low molecular weight lignin phenols by reducing the lignin in the presence of a reducing agent of carbon monoxide or hydrogen creating a reduction reaction mixture comprising oil soluble lignin phenols. The reduction occurs at a temperature greater than about 200° C. and a pressure greater than about 100 psi. The oil soluble lignin phenols are recovered from the reduction mixture and converted into lignin phenol surfactants by a reaction selected from the group consisting of alkoxylation, sulfonation, sulfation, alkylation, sulfomethylation, and alkoxysulfation.

DETAILED DESCRIPTION

Surfactant systems are conventionally injected into a reservoir to form a surfactant slug front followed by the injection of additional brine or water which may contain a mobility control agent. The surfactant slug of such a system may be between 0.05 to about 1.0 pore volumes, and preferably between about 0.1 to about 0.5 pore volumes in size. A typical surfactant system may contain (1) one or more petroleum sulfonates such as a water-soluble sulfonate having a relatively low equivalent weight, an oil soluble sulfonate having a relatively high equivalent weight or any other commercially available petroleum sulfonates; (2) a solubilizer or cosurfactant; (3) brine; and optionally, (4) a light hydrocarbon. Because brine is readily available in the oil field, it is clearly the aqueous solvent of choice. Although surfactant systems may perform better in fresh water with a relatively low salinity, economics mandate the use of field brines wherever possible. Consequently, surfactant systems are tailored to provide acceptable recoveries with the use of a brine solvent.

Most enhanced oil recovery surfactant systems have fresh water polymer drives. This is despite the extra cost associated with injecting large quantities of fresh water instead of brine. However, some surfactant systems have been adapted to enable a saline drive fluid to be used.

The present invention offers the opportunity to substantially lower the cost of surfactant flooding by replacing the standard petroleum sulfonate surfactant system with a surfactant system comprising relatively low cost components of lignin phenol surfactant, lignin, amine and a solubilizer. Of these four chief components in the invention surfactant system, only the solubilizer is a high cost, petroleum-based compound.

The instant method of recovering hydrocarbons from an underground hydrocarbon formation comprises several steps. The first step is injecting into the underground formation through an injection well an aqueous surfactant slug. The slug comprises about 0.1% to about 10%, preferably about 1% to about 5% by weight surfactant system. The surfactant slug is followed by a drive fluid to push the surfactant slug towards a production well. Hydrocarbons are recovered at the production well.

The surfactant system is comprised of a lignin phenol surfactant, a lignin, a primary amine having about 8 to about 20 carbon atoms, and a solubilizer. This is not an exclusive list. Other components may be blended into the surfactant slug. Additional possibilities include other surfactants such as petroleum sulfonates and additional solubilizer cosurfactants. Viscosity improving polymers may even be added to the surfactant slug.

Preferably, the surfactant system is comprised of about 5% to about 75% by weight of lignin phenol surfactant, about 10% to about 80% by weight of lignin, about 1% to about 20% by weight of amine, and about 5% to about 60% by weight of solubilizer. More preferably, the surfactant system is comprised of about 10% to about 60% by weight of lignin phenol surfactant, about 20% to about 60% by weight of lignin, about 5% to about 15% by weight of primary amine, and about 10% to about 50% by weight of solubilizer.

Of course, not every combination of components will yield a stable and active surfactant system. Surfactant systems may be stable or unstable and have varying degrees of surfactant activity depending upon the specific lignin phenol surfactants, lignin, solubilizer, amine, and brine employed in a particular system. It is well-known in the art that each surfactant system must be tested. One cannot rely upon generalities as to stability or surfactant activity in multi-component surfactant systems.

As in most surfactant flooding, the invention comprises injecting a surfactant slug having a pore volume of about 0.05 to about 1.0 pore volumes, more preferably about 0.1 to about 0.5 pore volumes. Although the injection of a higher pore volume slug may be desirable from a hydrocarbon recovery viewpoint, this must be balanced against the cost of additional surfactant in a larger pore volume slug. With the replacement of higher cost petroleum sulfonates with a lower cost surfactant system, the present invention should permit the use of larger pore volume slugs in surfactant flooding.

The lignin employed in the surfactant system may be a modified kraft lignin usually oxidized or sulfonated, although a lignosulfonate is preferred. A non-modified kraft lignin is not effective since it lacks water solubility. As used herein, the term lignin (except for lignin phenol surfactant) refers to those modified lignins which are effective in the invention system.

The amine is a primary amine having about 8 to about 20 carbon atoms. Tallow amine is preferred.

The solubilizer or cosurfactant is a surfactant which when added to the surfactant system will create a stable and surface active system. Preferred solubilizers are alkyl ethoxy sulfates or alkylaryl ethoxy sulfates.

The lignin phenol surfactant required for the invention surfactant system is produced by a multi-step process from lignin. The lignin is first reduced at elevated temperature and pressure in the presence of carbon monoxide or hydrogen to yield a lignin phenol. The lignin phenol is then subjected to one or more reactions designed to add water solubility to the lignin phenol product and produce a lignin phenol surfactant.

When used within this Application, the term "lignin phenol" refers to the reduction product of lignin which is reduced in the presence of carbon monoxide or hydrogen at a temperature greater than about 200° C. and a pressure greater than about 100 psi.

The reductive degradation of lignin under these selected conditions produces a complex mixture of low molecular weight lignin phenols that are generally derived from or based on a propylphenol structure which has high solubility in organic solvents. Analysis of the lignin phenol reaction product indicates an average molecular weight of about 300 and a range of about 150 to about 1000, compared to a propylphenol molecular weight of 136 and lignin molecular weight of 3000 to 15,000. It is believed that the lignin phenol product is composed of 2, 3, 4, or more propane phenols linked or fused together plus assorted methoxyls, hydroxyls and other oxygens. Whenever the phrase "lignin phenol" is used herein, it refers to the above product mixture and not propylphenol.

The reduction reaction is carried out by placing a lignin in contact with water. The lignin may be dissolved or slurried in an aqueous medium at concentrations preferably ranging from about 5% to about 20% by weight. Sodium hydroxide or a similar compound may also be placed in the aqueous medium in a concentration of about 1% to about 15% by weight to increase lignin solubility. The reducing agent is injected into the reaction vessel to blanket the reduction reaction mixture at an initial pressure greater than about 100 psi, preferably greater than about 500 psi. The reducing gas is preferably carbon monoxide or hydrogen or a mixture of both.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

A catalyst may be employed to increase the yield. A ferrous salt is the preferred catalyst for hydrogenation of lignosulfonate. Other metal ions which may be used to catalyze the lignosulfonate hydrogenation are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney nickel catalyst, based on the weight of the kraft lignin.

In general, the hydrogen reduction reaction should be allowed to proceed at reaction temperature and pressure for a period of about 30 minutes to about 5 hours and the carbon monoxide reduction for a time period of about 15 minutes to about 2 hours. The oil soluble lignin phenols can then be extracted from the reduction reaction mixture with an organic solvent. Preferred solvents are ether, diethylether, tetrahydrofuran, benzene and toluene. The lignin phenols may then be ethoxylated and sulfated by means known in the art.

The reduction of lignin by hydrogen and carbon monoxide and their ethoxylation and sulfation is discussed in detail in U.S. Pat. No. 4,739,040, the disclosure of which is incorporated herein by reference.

The lignin phenols are converted to lignin phenol surfactants by one or more reactions selected from the group consisting of alkoxylation, sulfonation, sulfation, alkylation, sulfomethylation, and alkoxysulfation, to provide some water solubility to the oil soluble lignin phenols. In general, these reactions are known in the art. Further details as to these reactions with lignin phenols may be found in the U.S. Pat. No. 4,739,040 reference, previously incorporated by reference.

The most preferred reaction is a sulfonation reaction to yield a lignin phenol sulfonate. A preferred sulfonation method is to sulfomethylate the lignin phenol with formaldehyde and sodium sulfite or sodium bisulfite. The sulfomethylation reaction adds the sulfomethylene group ($-CH_2SO_3Na$) to the lignin phenol. Sulfuric acid, sulfur trioxide, or sulfur trioxide-dioxane complex may also be used to sulfonate the lignin phenol.

The following examples will further illustrate the novel surfactant system of the present invention. These examples are given by way of illustration and not as limitations to the scope of the invention. Thus, it should be understood that the composition and amounts of the surfactant system may be varied to achieve similar results within the scope of the invention.

EXAMPLES

Blends of several surfactant systems within the scope of the invention were prepared and tested for stability andinterfacial activity. Corefloods were also performed on the most effective blends indicated by the screening tests.

In the test, three different lignin phenol sulfonates were employed (LPS-1, LPS-2 and LPS-3). LPS-1 started as Lignosite 458, a trademarked softwood sodium lignosulfonate sold by Georgia Pacific Corp. The lignosulfonate was reduced at 410° C. by carbon monoxide and then sulfonated by reaction with sulfur trioxide-dioxane complex. LPS-2 started as a kraft lignin that was reduced at 410° C. with carbon monoxide in the presence of a hydrogen sulfide catalyst, and sulfonated by sulfur trioxide-dioxane complex. LPS-3 started as Lignosite 458 which was reduced at 440° C. with carbon monoxide, and sulfonated by sulfur trioxide-dioxane complex.

The two solubilizers employed in the examples were LN-60COS, a trademarked linear alkyl ethoxy sulfate having an average of 6 ethylene oxide groups and a 12 to 14 carbon alkyl chain. Alipal CO-436 is a nonyl phenol ethoxy sulfate having an average of 4 ethylene oxide groups per molecule.

The amine employed was Adogen 170 (A-170), a trademarked tallow amine sold by Sherex Chemical Co. The lignin employed was Lignosite 458 (Lig. 458). In the corefloods, a polyacrylamide polymer drive was employed comprising continuous 1500 ppm NalFlo 3857 in laboratory simulated Illinois fresh water having a salinity of about 343 ppm TDS. NalFlo 3857 is a trademarked polyacrylamide sold by Nalco Chemical Co.

The brine used in all of the surfactant blends and corefloods simulated a Southern Illinois brine having a salinity of 68,000 ppm TDS and a divalent ion content of 3800 ppm TDS.

EXAMPLES 1-9

Stable and aCtiVe blends were prepared with all three sulfonated lignin phenols (LPS-1, LPS-2, and LPS-3), LN-60COS, Adogen-170 tallow amine, and Lignosite 458 lignosulfonate. The total concentration of all four components was 3% by weight in a laboratory simulated Southern Illinois injection brine of 68,000 ppm TDS. Blends containing from 0.2 to 0.5 wt % tallow amine were evaluated. Solution stabilities were determined after 1 day. Interfacial tension versus a Southern Illinois crude oil was measured for each stable blend after a 1 hour equilibration. The Southern Illinois crude had an API gravity of 36°-38°.

Each sulfonated lignin phenol gave stable and active blends at each of the different amine levels evaluated. Table 1 indicates that a wide range of interfacial tensions was generally observed for blends at each amine level. This was due to changes in the concentrations of the other three components of the surfactant system. The minimum interfacial tensions observed was about 100 mdynes/cm.

TABLE 1

RANGES OF INTERFACIAL TENSION (IFT) FOR LIGNIN/AMINE/SULFONATEDPHENOL/LN-60COS BLENDS AT DIFFERENT AMINE LEVELS

| EXAMPLES | Lignin Phenol Sulfonates | Amine A-170 (wt %) | IFT Range (mdynes/cm) |
|---|---|---|---|
| 1 | LPS-1 | 0.2 | 192-523 |
| 2 | LPS-1 | 0.3 | 129-394 |
| 3 | LPS-1 | 0.4 | 131-898 |
| 4 | LPS-1 | 0.5 | 118-1002 |
| 5 | LPS-3 | 0.3 | 132-1126 |
| 6 | LPS-3 | 0.4 | 120-1143 |
| 7 | LPS-2 | 0.2 | 261-359 |
| 8 | LPS-2 | 0.3 | 119-995 |
| 9 | LPS-2 | 0.4 | 68-252 |

Several of these blends provided low interfacial tension between 100 and 200 mdynes/cm where the concentration of LN-60COS (the most inexpensive component) was in the 20% to 30% range and the concentration of the lignosulfonate (the most inexpensive component) was in the 50% to 60% range.

The regions where stable lignin/amine/sulfonated lignin phenol/LN-60COS blends could be prepared were not affected significantly by changing the sulfonated lignin phenol or the amine level. As the amine content of the blends was increased, the number of stable blends slightly decreased. At 0.5 wt % amine, precipitation became a problem.

EXAMPLE 10

A number of blends were prepared at a level of 3% active surfactant in the Southern Illinois brine where the four components were the lignin phenol sulfonate identified as LPS-3, Lignosite 458, Adogen-170 and the Alipal CO-436 solubilizer. Stable and active blends were prepared containing 0.2% and 0.3 wt % A-170.

At 0.2% by weight amine, the stability limits and interfacial tensions for blends with Alipal CO-436 were similar to those reported earlier for blends with LN-60COS solubilizer. None of the blends had ultralow interfacial tensions, however, interfacial tensions were in the low 100s. At 0.3% by weight amine, the solubilizer amount required to produce stable blends with Alipal CO-436 was higher, but 5 of the 8 stable blends prepared had ultralow interfacial tensions below 30 mdynes/cm.

The ultralow interfacial tensions observed of 7 to 27 mdynes/cm were all in the range of 30-50% Lignosite 458, 10-40% LPS-3 and 30-40% Alipal CO-436.

As mentioned earlier, Alipal CO-436 has only 4 ethylene oxide groups compared to an average of 6 ethylene oxide groups for LN-60COS. The chief difference between the surfactant systems of Examples 1-9 and Example 10 was the use of a solubilizer having lower water solubility because of its fewer ethylene oxide groups per molecule. This was sufficient to increase the oil solubility of the stable blends, resulting in lower interfacial tension values, but a slightly higher solubilizer requirement.

EXAMPLES 11-15

Corefloods were performed with surfactant systems employing both solubilizers LN-60COS and Alipal CO-436. Outstanding recoveries in excess of 70% of waterflood residual oil were obtained with systems employing each solubilizer.

The coreflood evaluations were performed in 2 inches × 2 inches × 12 inches Berea sandstone cores cast in an epoxy mold. Each core was evacuated by a vacuum pump and saturated with the injection brine of 68,000 ppm TDS. The cores typically had a 150 ml pore volume, a porosity of about 0.21-0.22 and a permeability of about 250-500 millidarcies.

Each core was flooded at a frontal advanced rate of 10 feet per day with the same Southern Illinois crude having a density of 0.84 grams/ml and a viscosity of 6.4 cp until water production ceased. Each core was then flooded with the synthetic brine at a rate of 5 feet per day until waterflood residual oil saturation was reached. All corefloods were performed at approximately 75° F.

The surfactant systems were evaluated by injecting a 0.2 pore volume slug of a 3% or 5% by weight active surfactant blend in the injection brine into the waterflooded core followed by a continuous 1500 ppm Nal-Flo 3857 polyacrylamide polymer drive in simulated fresh water of 343 ppm TDS. The polyacrylamide slug had a viscosity of about 150 cp. Surfactant and polymer solutions were injected at a frontal advance rate of 1 foot per day. Polymer injection continued until oil production ceased.

Examples 11-13 in Table 2 were performed with an overall 3% component concentration in the brine, whereas Examples 14-16 were performed with an overall component concentration of 5% in brine.

TABLE 2

COREFLOODS WITH LN-60COS SOLUBILIZER

| Examples | Composition (wt %) | | | | IFT (mdynes/cm) | $E_R$, % |
| --- | --- | --- | --- | --- | --- | --- |
| | A-170 | Lig. 458 | LPS-2 | LN-60COS | | |
| 11 | 0.3 | 1.08 | 1.08 | 0.54 | 594 | 49 |
| 12 | 0.4 | 1.3 | 0.78 | 0.52 | 68 | 52 |
| 13 | 0.4 | 0.78 | 1.3 | 0.52 | 138 | 56 |
| 14 | 0.67 | 1.3 | 2.16 | 0.87 | — | 74 |
| 15 | 0.67 | 1.3 | 2.16 | 0.87 | — | 78 |

TABLE 2-continued

COREFLOODS WITH LN-60COS SOLUBILIZER

| Examples | Composition (wt %) | | | | IFT (mdynes/cm) | $E_R$, % |
| --- | --- | --- | --- | --- | --- | --- |
| | A-170 | Lig. 458 | LPS-2 | LN-60COS | | |
| 16 | 0.5 | 1.8 | 1.8 | 0.9 | — | 60 |

Although Table 2 indicates corefloods with only the LPS-2 lignin phenol sulfonate, excellent results were also obtained with the LPS-1 sulfonate. Higher recovery with both lignin phenol sulfonates was achieved when the amine level was increased to at least 0.3% by weight. When the amine concentration was increased to 0.4% by weight and the proportions of blend components were changed in Examples 12-13, recovery again increased to over 50%. A reformulation to the 5% active component solution of Example 14-16 greatly increased recovery efficiency to 74% and 78% for Examples 14-15. The production profiles of the Examples 14-15 corefloods were excellent. High oil cuts and a large oil bank were obtained.

Example 15 was a repeat run of Example 14 coreflood, performed to verify the reproducibility of the coreflood. In the repeat run, a higher recovery efficiency was obtained. Oil production and recovery curves for the two corefloods were virtually identical.

EXAMPLES 17-22

The Examples 17-21 corefloods of Table 3 were performed using the LPS-3 lignin phenol surfactant and the Alipal CO-436 solubilizer in an overall 3% active concentration. The concentration was increased to 5% active components in the Example 22 coreflood.

TABLE 3

COREFLOODS WITH CO-436 SOLUBILIZER

| Examples | Composition (wt %) | | | | IFT (mdynes/cm) | $E_R$, % |
| --- | --- | --- | --- | --- | --- | --- |
| | A-170 | Lig. 458 | LPS-3 | Alipal CO-436 | | |
| 17 | 0.3 | 1.08 | 0.54 | 1.08 | 4 | 63 |
| 18 | 0.3 | 1.35 | 0.54 | 0.81 | 27 | 50 |
| 19 | 0.3 | 1.08 | 0.81 | 0.81 | 10 | 49 |
| 20 | 0.3 | 0.81 | 1.08 | 0.81 | 27 | 59 |
| 21 | 0.3 | 0.54 | 1.35 | 0.81 | 355 | 57 |
| 22 | 0.5 | 1.35 | 1.8 | 1.35 | — | 70 |

Overall, the blends With Alipal CO-436 performed as well as the blends with LN-60COS. The 63% recovery efficiency of Example 17 was the highest recovery obtained with a 3% active component blend regardless of solubilizer or lignin phenol sulfonate employed. The Example 22 coreflood gave an outstanding recovery efficiency of 70% at a 5% active component concentration.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:
    injecting into the formation through an injection well about 0.05 to about 1.0 pore volumes of an aqueous surfactant slug comprising about 0.1% to about 10% by weight surfactant system;

said surfactant system comprised of a lignin phenol surfactant, a lignin, a primary amine having about 8 to about 20 carbon atoms, and a solubilizer, said lignin phenol surfactant produced by placing lignin in contact with water, converting the lignin into low molecular weight lignin phenols by reducing the lignin in the presence of a reducing agent of carbon monoxide or hydrogen creating a reduction reaction mixture comprising oil soluble lignin phenols, said reduction occurring at a temperature greater than about 200° C. and a pressure greater than about 100 psi, recovering the oil soluble lignin phenols from the reduction mixture and converting the lignin phenols into lignin phenol surfactant by a reaction selected from the group consisting of alkoxylation, sulfonation, sulfation, alkylation, sulfomethylation, and alkoxysulfation;

injecting into the formation through the injection well a drive fluid to push the surfactant slug towards a production well; and recovering hydrocarbons at the production well.

2. The method of claim 1, wherein the surfactant system is comprised of about 5% to about 75% by weight of lignin phenol surfactant, about 10% to about 80% by weight of lignin, about 1% to about 20% by weight of amine, and about 5% to about 60% by weight of solubilizer.

3. The method of claim 2, wherein the lignin comprises about 20% to about 60% by weight of the surfactant system.

4. The method of claim 2, wherein the primary amine comprises about 5% to about 15% by weight of the surfactant system.

5. The method of claim 2, wherein the lignin phenol surfactant comprises about 10% to about 60% by weight of the surfactant system.

6. The method of claim 2, wherein the solubilizer comprises about 10% to about 50% by weight of the surfactant system.

7. The method of claim 1, wherein the lignin phenol surfactant is a lignin phenol sulfonate.

8. The method of claim 1, wherein about 0.1 to about 0.5 pore volumes of surfactant slug is injected.

9. The method of claim 1, wherein the surfactant slug is comprised of about 1% to about 5% by weight surfactant system.

10. The method of claim 1, wherein the primary amine is a tallow amine.

11. The method of claim 1, wherein the solubilizer is an alkyl ethoxy sulfate or an alkylaryl ethoxy sulfate.

12. The method of claim 1, wherein the lignin is oxidized kraft lignin, sulfonated kraft lignin, or lignosulfonate.

13. The method of claim 1, wherein the reducing agent of hydrogen or carbon monoxide blankets the reduction reaction mixture at an initial pressure greater than about 500 psig.

14. The method of claim 1, wherein the reduction reaction occurs at a temperature of about 300° C. to about 550° C.

15. The method of claim 1, further comprising subjecting the lignin phenol surfactant product to a second reaction selected from the group consisting of alkoxylation, sulfonation, sulfation, alkylation, sulfomethylation, and alkoxysulfation.

16. A method of recovering hydrocarbons from an underground hydrocarbon formation penetrated by at least one injection well and at least one production well, which comprises:

injecting into an underground formation through an injection well about 0.1 to about 0.5 pore volumes of an aqueous surfactant slug comprising about 1% to about 5% by weight surfactant system, said surfactant system comprised of about 10% to about 60% lignin phenol surfactant, about 20% to about 60% lignin, about 5% to about 15% of a primary amine having about 8 to about 20 carbon atoms, and about 10% to about 50% of a solubilizer, said lignin phenol surfactant produced by placing lignin in contact with water, converting the lignin into low molecular weight lignin phenols by reducing the lignin in the presence of a reducing agent of carbon monoxide or hydrogen creating a reduction reaction mixture comprising oil soluble lignin phenols, said reduction occurring at a temperature between about 300° C. and about 550° C. and a pressure greater than about 500 psig, recovering the oil soluble lignin phenols from the reduction mixture, and converting the lignin phenols into lignin phenol sulfonates by a sulfonation reaction;

injecting into the formation through the injection well a drive fluid to push the surfactant slug towards the production well; and recovering hydrocarbons at the production well.

* * * * *